(12) United States Patent
Barron

(10) Patent No.: US 6,979,199 B2
(45) Date of Patent: Dec. 27, 2005

(54) METHOD AND SYSTEM FOR TRAINING AND ORGANIZING ON-SITE EVENT PROFESSIONALS

(75) Inventor: Ashley L. Barron, Chevy Chase, MD (US)

(73) Assignee: Tartan LLC, Bethesda, MD (US)

( * ) Notice: Subject to any disclaimer, the term of this patent is extended or adjusted under 35 U.S.C. 154(b) by 390 days.

(21) Appl. No.: 10/422,960

(22) Filed: Apr. 25, 2003

(65) Prior Publication Data

US 2003/0203344 A1 Oct. 30, 2003

Related U.S. Application Data

(60) Provisional application No. 60/375,411, filed on Apr. 26, 2002.

(51) Int. Cl.[7] .................................. G09B 19/00
(52) U.S. Cl. .................. 434/219; 434/107; 434/118; 434/365; 705/5
(58) Field of Search ................ 434/107, 108, 434/118, 156, 219, 322, 350, 362, 365; 705/1, 705/2, 5, 6, 27, 36; 701/201, 209, 213; 348/207.99

(56) References Cited

U.S. PATENT DOCUMENTS

| | | | | |
|---|---|---|---|---|
| 5,237,499 A | * | 8/1993 | Garback | 705/5 |
| 5,309,355 A | * | 5/1994 | Lockwood | 705/6 |
| 5,570,283 A | * | 10/1996 | Shoolery et al. | 705/5 |
| 5,634,016 A | | 5/1997 | Steadham, Jr. et al. | |
| 5,832,451 A | * | 11/1998 | Flake et al. | 705/5 |
| 5,832,454 A | | 11/1998 | Jafri et al. | |
| 5,924,075 A | | 7/1999 | Kanemitsu | |
| 5,940,803 A | | 8/1999 | Kanemitsu | |
| 5,948,040 A | * | 9/1999 | DeLorme et al. | 701/201 |
| 6,023,679 A | | 2/2000 | Acebo et al. | |
| 6,131,093 A | | 10/2000 | Maruyama et al. | |
| 6,171,109 B1 | * | 1/2001 | Ohsuga | 434/118 |
| 6,240,362 B1 | * | 5/2001 | Gaspard, II | 701/209 |
| 6,847,892 B2 | * | 1/2005 | Zhou et al. | 701/213 |
| 2002/0150869 A1 | * | 10/2002 | Shpiro | 434/156 |
| 2003/0040946 A1 | * | 2/2003 | Sprenger et al. | 705/6 |
| 2003/0115116 A1 | * | 6/2003 | Crampton | 705/27 |
| 2003/0177044 A1 | * | 9/2003 | Sokel et al. | 705/5 |
| 2003/0208378 A1 | * | 11/2003 | Thangaraj et al. | 705/2 |
| 2004/0176970 A1 | * | 9/2004 | Paluszek et al. | 705/1 |
| 2005/0080705 A1 | * | 4/2005 | Chaganti | 705/36 |
| 2005/0128304 A1 | * | 6/2005 | Manasseh et al. | 348/207.99 |

* cited by examiner

Primary Examiner—Joe H. Cheng
(74) Attorney, Agent, or Firm—Winston & Strawn LLP

(57) ABSTRACT

The invention is a system and method for training and organizing on-site event professionals in the hospitality and tourism industry. The system has at least one server computer having a processor, an area of main memory for executing program code under the direction of the processor, a storage device for storing data and program code and a bus connecting the processor and the storage device, at least one relational database stored on the storage device, a data communications device connected to the bus for connecting the server computer to the Internet and Web-based training for on-site event professionals computer program code stored in the storage device and executing in the main memory under the direction of the processor.

23 Claims, 28 Drawing Sheets

100

Arrival Manifest – Reagan National Airport (DCA)
Thursday, April 22, 2001
XYZ Annual Convention
All Transfers to the Mayflower Hotel

| Last Name | First Name | Airport | Airline | Flight Number | City of Origin | Arrival Time |
|---|---|---|---|---|---|---|
| Jones | Samuel | DCA | American | 2321 | Los Angeles | 2:00pm |
| Jones | Rebecca | DCA | American | 2321 | Los Angeles | 2:00pm |
| Smith | Ed | DCA | American | 2321 | Los Angeles | 2:00pm |
| Williams | Valerie | DCA | United | 552 | St Louis | 3:02pm |
| Roberts | James | DCA | Delta | 417 | Miami | 3:42pm |
| Roberts | Mary | DCA | Delta | 417 | Miami | 3:42pm |
| Roberts | Stephanie | DCA | Delta | 417 | Miami | 3:42pm |
| Doe | Jane | DCA | US Airways | 148 | Boston | 5:16pm |
| Richards | John | DCA | Northwest | 201 | Dallas | 6:57pm |

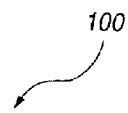

Arrival Manifest – Reagan National Airport (DCA)
Thursday, April 22, 2001
XYZ Annual Convention
All Transfers to the Mayflower Hotel

| Last Name | First Name | Airport | Airline | Flight Number | City of Origin | Arrival Time |
|---|---|---|---|---|---|---|
| Jones | Samuel | DCA | American | 2321 | Los Angeles | 2:00pm |
| Jones | Rebecca | DCA | American | 2321 | Los Angeles | 2:00pm |
| Smith | Ed | DCA | American | 2321 | Los Angeles | 2:00pm |
| Williams | Valerie | DCA | United | 552 | St Louis | 3:02pm |
| Roberts | James | DCA | Delta | 417 | Miami | 3:42pm |
| Roberts | Mary | DCA | Delta | 417 | Miami | 3:42pm |
| Roberts | Stephanie | DCA | Delta | 417 | Miami | 3:42pm |
| Doe | Jane | DCA | US Airways | 148 | Boston | 5:16pm |
| Richards | John | DCA | Northwest | 201 | Dallas | 6:57pm |

*Fig. 2*

On-Site Manager/COSEP Meet & Greet
Program Information Form

110

Client Name:
Client Code:                                    Order Number:
Date of Service:                                Total COSEP:

Exact Report Location    # of COSEP    Report Time    End Time
DCA ☐ Arrivals Door 6
     ☐ Other_____
IAD  ☐ Arrivals ??
     ☐ Other_____
BWI  ☐ Arrivals ??
     ☐ Other_____
US   ☐ Arrivals ??
     ☐ Other_____
Other

---

Company Contact Information
    Contact Name:                    Report To Name:
    Contact Phone:                   Mobile Phone:

---

Program Information
    Program Name:                    Program Demographics:
    Number of Guests:                Guest Greet Location:
    Billing Reference:

---

Transportation Information      Guests Transferred to:
    Vendor:              Contact Name:              Phone:
    Vehicle Type:
            Sedans ☐              Mini Coaches ☐
            Limos  ☐              Motor Coaches ☐
            Vans   ☐              Other         ☐

Vehicle Report Location:
    **Vehicles report 15 minutes prior to guest arrival.

---

Attire:
    Business ☐   Dark suit, white shirt
    Casual   ☐   Khakis & white collar shirt
    Other    ☐   _____

---

Communication equipment provided: type_____ quantity_____
Manifest to be delivered to site_____
Signage to be delivered to site_____

Fig. 3A

Signage to be delivered to site _____

Additional Information:

Date of Service: _____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service: _____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service: _____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |

*Fig. 3C*

On-Site Manager/COSEP Departures
Program Information Form

120

Client Code:
Dates of Service:                    Total COSEP:

Date of Service: _____     Report Location: _____

| # of COSEP's | Report Time | End Time |
|---|---|---|
|  |  |  |
|  |  |  |
|  |  |  |
|  |  |  |
|  |  |  |

Date of Service: _____     Report Location: _____

| # of COSEP's | Report Time | End Time |
|---|---|---|
|  |  |  |
|  |  |  |
|  |  |  |
|  |  |  |
|  |  |  |

Company Information
    Company Name:           Contact Name:
                                      Phone:

Program Information
    Program Name:           Program Demographics:
    Number of Guests:       Program Location:

*Fig. 4A*

Guest Departure Location _____

| Guest being transferred to: | Approx # of Guests |
|---|---|
| IAD | |
| DCA | |
| BWI | |
| US | |

Guest Departure Location _____

| Guest being transferred to: | Approx # of Guests |
|---|---|
| IAD | |
| DCA | |
| BWI | |
| US | |

Transportation Information
    Vendor:           Contact Name:           Phone:
    Vehicle Type:
        Sedans ☐           Mini Coaches ☐
        Limos ☐            Motor Coaches ☐
        Vans ☐             Other ☐ _____

Vehicle Report Location:
    **Vehicles report 15 minutes prior to guest arrival.

Attire:
    Dark Suit ☐
    Khakis & white collar shirt ☐
    Other ☐ _____

Additional Information:
_____
_____
_____
_____

Date of Service:_____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |

Date of Service:_____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |

Date of Service:_____

| COSEP Name | Report Location | Report Time | End Time | Attire |
|---|---|---|---|---|
| | | | | |
| | | | | |
| | | | | |
| | | | | |
| | | | | |
| | | | | |

*Fig. 4C*

On-Site Manager/COSEP City-Wide Shuttles
Program Information Form

130

Client Code:
Dates of Service:                                    Total COSEP:

Date of Service: _____    Report Location: _____

| # of COSEP's | Report Time | End Time |
|---|---|---|
|  |  |  |
|  |  |  |
|  |  |  |
|  |  |  |
|  |  |  |

Date of Service: _____    Report Location: _____

| # of COSEP's | Report Time | End Time |
|---|---|---|
|  |  |  |
|  |  |  |
|  |  |  |
|  |  |  |
|  |  |  |

Company Information
    Company Name:            Contact Name:
                             Phone:

Program Information
    Program Name:            Program Demographics:
    Number of Guests:        Program Location:

Primary Destination: _____    Route #: _____
Starting Location: _____
Start Time: _____    End Time: _____

| Shuttle Stops | Approx # of Guests | Pick-up/ Drop-off Location |
|---|---|---|
|  |  |  |
|  |  |  |
|  |  |  |

Primary Destination: _____    Route #: _____
Starting Location: _____
Start Time: _____    End Time: _____

| Shuttle Stops | Approx # of Guests | Pick-up/ Drop-off Location |
|---|---|---|
|  |  |  |
|  |  |  |
|  |  |  |

Primary Destination: _____    Route #: _____
Starting Location: _____
Start Time: _____    End Time: _____

| Shuttle Stops | Approx # of Guests | Pick-up/ Drop-off Location |
|---|---|---|
|  |  |  |
|  |  |  |
|  |  |  |

*Fig. 5B*

Transportation Information

Vendor:   Contact Name:   Phone:
Vehicle Type:
    Sedans   Mini Coaches ☐
    Limos   Motor Coaches ☐
    Vans   Other ☐ _____

Vendor:   Contact Name:   Phone:
Vehicle Type:
    Sedans   Mini Coaches ☐
    Limos   Motor Coaches ☐
    Vans   Other ☐ _____

Vendor:   Contact Name:   Phone:
Vehicle Type:
    Sedans   Mini Coaches ☐
    Limos   Motor Coaches ☐
    Vans   Other ☐ _____

Vehicle Report Location:
\*\*Vehicles report 15 minutes prior to guest arrival.

Attire:
Dark Suit ☐
Khakis & white collar shirt ☐
Other ☐ _____

Additional Information:
_____
_____
_____
_____
_____
_____
_____
_____
_____
_____
_____

Date of Service:_____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service:_____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service:_____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |

*Fig. 5D*

On-Site Manager/COSEP Point-to-Point Transfers
Program Information Form

140

Client Code:
Dates of Service:            Total COSEP:

Date of Service: _____     Report Location: _____

| # of COSEP's | Report Time | End Time |
|---|---|---|
|  |  |  |
|  |  |  |
|  |  |  |
|  |  |  |
|  |  |  |

Date of Service: _____     Report Location: _____

| # of COSEP's | Report Time | End Time |
|---|---|---|
|  |  |  |
|  |  |  |
|  |  |  |
|  |  |  |
|  |  |  |

Company Information
    Company Name:          Contact Name:
                                       Phone:

Program Information
    Program Name:          Program Demographics:
    Number of Guests:      Program Location:

Fig. 6A

| Point of Origin | Destination | Approx # of Guests | Start Time | End Time |
|---|---|---|---|---|
| | | | | |
| | | | | |
| | | | | |
| | | | | |
| | | | | |
| | | | | |
| | | | | |
| | | | | |

Transportation Information
- Vendor:  Contact Name:  Phone:
- Vehicle Type:
  - Sedans ☐
  - Limos ☐
  - Vans ☐
  - Mini Coaches ☐
  - Motor Coaches ☐
  - Other ☐ _____

Transportation Information
- Vendor:  Contact Name:  Phone:
- Vehicle Type:
  - Sedans ☐
  - Limos ☐
  - Vans ☐
  - Mini Coaches ☐
  - Motor Coaches ☐
  - Other ☐ _____

Transportation Information
- Vendor:  Contact Name:  Phone:
- Vehicle Type:
  - Sedans ☐
  - Limos ☐
  - Vans ☐
  - Mini Coaches ☐
  - Motor Coaches ☐
  - Other ☐ _____
- Vehicle Report Location:
- **Vehicles report 15 minutes prior to guest arrival.

Attire:
- Dark Suit ☐
- Khakis & white collar shirt ☐
- Other ☐

Additional Information:

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |

*Fig. 6C*

Tour Summary

| Date | Tour Start Time | Tour End Time | Tour Name | Tour Guide | Transportation Vendor | Type of Vehicle | Repo Time |
|---|---|---|---|---|---|---|---|
| 3/14/02 | 8:00am | 4:00am | Art & Our Nations Capital | Betty Harrison | Unified Vehicles | 55pax | 7:30am |
| 3/14/02 | 8:00am | 4:00am | Art & Our Nations Capital | Jennifer Tucker | Unified Vehicles | 55pax | 7:30am |
| 3/14/02 | 8:00am | 4:00am | Art & Our Nations Capital | James Redland | Unified Vehicles | 55pax | 7:30am |
| | | | | | | | |
| 3/14/02 | 8:00am | 4:30am | Annapolis om the 1800s | Suzy Heinz | Unified Vehicles | 55pax | 8:00am |
| 3/14/02 | 8:00am | 4:30am | Annapolis om the 1800s | Toby Charles | Unified Vehicles | 55pax | 8:00am |
| | | | | | | | |
| 3/14/02 | 99:00am | 1:00am | The View from Capital Hill | Marielle Gibson | World's Best Cars | 47pax | 8:30am |
| 3/14/02 | 9:00am | 1:00am | The View from Capital Hill | Marielle Gibson | World's Best Cars | 47pax | 8:30am |
| | | | | | | | |
| 3/14/02 | 10:00am | 3:00am | Arlington Cemetary | Sam Martinez | Donash Ccoach | 25pax | 9:30am |

On-Site Manager/COSEP Tour Programs
Program Information Form

Client Code:
Dates of Service:                                    Total COSEP:

Date of Service: _____       Report Location:

| # of COSEP's | Report Time | End Time |
|---|---|---|
|  |  |  |
|  |  |  |
|  |  |  |
|  |  |  |
|  |  |  |

Date of Service: _____       Report Location:

| # of COSEP's | Report Time | End Time |
|---|---|---|
|  |  |  |
|  |  |  |
|  |  |  |
|  |  |  |
|  |  |  |

Company Information
    Company Name:          Contact Name:
                           Phone:

Program Information
    Program Name:          Program Demographics:
    Number of Guests:
    Attire:
        Dark Suit                     ☐
        Khakis & white collar shirt  ☐
        Other                         ☐

Additional Information:
    Will Guests be Ticketed? _____ Who will be responsible for collecting ticket _____

\* See Tour Summary Form

Fig. 8A

Date of Service: ____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service: ____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |
|  |  |  |  |  |

Date of Service: ____

| COSEP Name | Report Location | Report Time | End Time | Attire |
|---|---|---|---|---|
|  |  |  |  |  |
|  |  |  |  |  |
|  |  |  |  |  |
|  |  |  |  |  |
|  |  |  |  |  |

*Fig. 8B*

On-Site Manager/COSEP Events
Program Information Form                      170

Client Code:
Dates of Service:                              Total COSEP:

Date of Service: _____        Report Location:

| # of COSEP's | Report Time | End Time |
|---|---|---|
|  |  |  |
|  |  |  |
|  |  |  |
|  |  |  |
|  |  |  |

Date of Service: _____        Report Location:

| # of COSEP's | Report Time | End Time |
|---|---|---|
|  |  |  |
|  |  |  |
|  |  |  |
|  |  |  |
|  |  |  |

Company Information
    Company Name:        Contact Name:
                          Phone:

Program Information:
    Event Name:
    Number of Guests:
    Start Time:

Event Demographics:
Event Location:
End Time:

Event Vendor Information

| Vender | Contact Name | Contact Number | Report Location | Report Time | End Time | Service Provider | Other Comments |
|---|---|---|---|---|---|---|---|
|  |  |  |  |  |  |  |  |
|  |  |  |  |  |  |  |  |
|  |  |  |  |  |  |  |  |

Transportation Information
    Vendor:    Contact Name:    Phone:
    Vehicle Type:
        Sedans ☐    Mini Coaches ☐
        Limos ☐    Motor Coaches ☐
        Vans ☐    Other ☐

Vehicle Report Location:
    **Vehicles report 15 minutes prior to guest arrival.

Attire:
    Dark Suit ☐
    Khakis & white collar shirt ☐
    Other ☐

Fig. 9B

Date of Service:

| COSEP Name | COSEP Responsibilities | Report Location | Report Time | End Time | Attire |
|---|---|---|---|---|---|
| | | | | | |
| | | | | | |
| | | | | | |
| | | | | | |
| | | | | | |
| | | | | | |
| | | | | | |
| | | | | | |
| | | | | | |
| | | | | | |

**On-Site Manager/COSEP Hospitality Desk
Program Information Form**                    180

Client Code:
Dates of Service:                                        Total COSEP:

Date of Service: _____        Report Location:

_____

| # of COSEP's | Report Time | End Time |
|---|---|---|
|  |  |  |
|  |  |  |
|  |  |  |
|  |  |  |
|  |  |  |

Date of Service: _____        Report Location:

_____

| # of COSEP's | Report Time | End Time |
|---|---|---|
|  |  |  |
|  |  |  |
|  |  |  |
|  |  |  |
|  |  |  |

Date of Service: _____        Report Location:

_____

| # of COSEP's | Report Time | End Time |
|---|---|---|
|  |  |  |
|  |  |  |
|  |  |  |
|  |  |  |
|  |  |  |

Company Information
    Company Name:            Contact Name:
                                               Phone:

Program Information
    Company Name:            Program demographics:
    Number of Guests:

Number of Quest:          Program Location

Phone:

Attire:
    Dark Suit                ☐
    Khakis & white collar shirt ☐
    Other                    ☐ _____

Additional Information:

*Fig. 10B*

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |

On-Site Manager/COSEP Registration Desk
Program Information Form

190

Client Code:
Dates of Service:                                    Total COSEP:

Date of Service: _____        Report Location:

| # of COSEP's | Report Time | End Time |
|---|---|---|
|  |  |  |
|  |  |  |
|  |  |  |
|  |  |  |

Date of Service: _____        Report Location:

| # of COSEP's | Report Time | End Time |
|---|---|---|
|  |  |  |
|  |  |  |
|  |  |  |
|  |  |  |

Date of Service: _____        Report Location:

| # of COSEP's | Report Time | End Time |
|---|---|---|
|  |  |  |
|  |  |  |
|  |  |  |
|  |  |  |

| | |
|---|---|
| Company Information | |
| Company Name: | Contact Name: |
| | Phone: |

| | |
|---|---|
| Program Information | |
| Program Name: | Program Demographics: |
| Number of Guests: | Program Location: |

Attire:
    Dark Suit ☐
    Khakis & white collar shirt ☐
    Other ☐ _____

Additional Information:
_____
_____
_____
_____
_____

Fig. 11B

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |
| | | | | |
| | | | | |
| | | | | |
| | | | | |
| | | | | |
| | | | | |

Date of Service: _____

| COSEP Name | Report Location | Report Time | End Time | Attire |
|---|---|---|---|---|
| | | | | |
| | | | | |
| | | | | |
| | | | | |
| | | | | |

Fig. 11C

METHOD AND SYSTEM FOR TRAINING AND ORGANIZING ON-SITE EVENT PROFESSIONALS

CROSS-REFERENCE TO RELATED APPLICATION

This application claims the benefit of U.S. Provisional Patent Application Ser. No. 60/375,411, filed Apr. 26, 2002.

BACKGROUND OF THE INVENTION

1. Field of the Invention

The present invention relates to a method and system for training and organizing on-site event professionals. More specifically, the present invention is a method and system for training and organizing professionals in the hospitality and tourism industry.

2. Description of Related Art

Hospitality and tourism is the third largest revenue producing industry in the United States. Demand for qualified people is high in this industry, especially in large cites such as New York, London, Paris and Washington D.C. These cities depend on the billions of dollars in revenue generated as a result of hospitality and tourism. The related art includes many system and business methods involving hospitality and tourism.

U.S. Pat. No. 5,634,016 issued to Steadham, Jr. et al., outlines a computer integrated event management system that coordinates the entire process of event planning and implementation, using specialized software combined with a microcomputer network, which includes a network file server. CAD/DATA stations and DATA stations are used by facility personnel to efficiently plan and implement events. The system includes a fully relational database and CAD module which are connected together using a third module such that, whenever a piece of information is changed in one place, it is automatically changed everywhere it is stored in the database.

U.S. Pat. No. 5,832,454 issued to Jafri et al., outlines a reservation program providing for greater speed and ease of use than has been possible with existing systems. In a typical implementation, the reservation software is run on a personal computer connected to a server node through a dial up line. The server node is in turn connected to a computer reservation system such as SystemOne, Apollo or Sabre.

U.S. Pat. No. 5,924,075 issued to Kanemitsu, outlines a system which is capable of planning a tour time schedule using simple facility information entered by a traveler, and then easily and quickly preparing a complete itinerary for implementing a comfortable tour. When the traveler inputs desired facilities and destinations, departure dates and times, a departure location and a return destination, a schedule preparation section calculates the basic route by searching databases and basic stay time previously set with regard to the entered facilities from the basic stay time storage section, thereby preparing an itinerary.

U.S. Pat. No. 5,940,803 issued to Kanemitsu, outlines an itinerary making system for preparing an itinerary according to the facilities that can be used timely, by a simple inputting operation. When a traveler enters desired facility information and visiting purposes through an input unit, a plan preparing unit retrieves from a database, recommended visiting times for using the facilities, according to each visiting purpose.

U.S. Pat. No. 6,023,679 issued to Acebo et al., outlines a method and system for effecting the instantaneous data transmission to a locally operated computer system upon an occurrence in the computer reservation system. Specifically, a method for automatically generating pre-ticketed travel information is disclosed, in which booked reservation information and traveler information is automatically transmitted to a locally operated computer system, as soon as the booking of the reservation is complete.

U.S. Pat. No. 6,131,093 issued to Maruyama et al., outlines a job scheduling system for solving scheduling problems such as a production programming, and in particular, to a scheduling system for generating restriction violating conditions or restriction satisfying conditions and properly using these conditions, in later processes, so as to effectively set out a schedule.

Although each of these patents describe useful systems and business methods, what is really needed is a training and organizing system and method for the hospitality and tourism industry. Such a training and organizing system and method can address the marketplace's demand for qualified professionals in the hospitality and tourism industry.

None of the above inventions and patents, taken either singly or in combination, is seen to describe the instant invention as claimed.

SUMMARY OF THE INVENTION

The invention is a system and method for training and organizing on-site event professionals in the hospitality and tourism industry. The system has at least one server computer having a processor, an area of main memory for executing program code under the direction of the processor, a storage device for storing data and program code and a bus connecting the processor and the storage device. At least one relational database is stored on the storage device and a data communications device is connected to a bus for connecting the server computer to the Internet and providing Web-based training for on-site event professionals. Computer program code is also stored in the storage device and executes in the main memory, under the direction of the processor.

Accordingly, it is a principal object of the invention to provide organizing and training for persons in the hospitality and tourism industry.

It is another object of the invention to provide organizing and training for persons in the hospitality and tourism industry over the Internet.

It is a further object of the invention to provide testing and certification for persons in the hospitality and tourism industry.

Still another object of the invention is to produce qualified and experienced people for employment in the hospitality and tourism industry.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a sample arrival manifest for training and organizing on-site event professionals.

FIGS. 3A, 3B and 3C make-up a meet and greet program information form.

FIGS. 4A, 4B and 4C make-up a departure program information form.

FIGS. 5A, 5B, 5C and 5D make-up a city-wide shuttles program information form.

FIGS. 6A, 6B and 6C make-up a point-to-point transfers program information form.

FIG. 7 is a tour summary form.

FIGS. 8A and 8B make-up a tour program information form.

FIGS. 9A, 9B, 9C and 9D make-up an event program information form.

FIGS. 10A, 10B and 10C make-up a hospitality desk program information form.

FIGS. 11A, 11B and 11C make-up a registration desk program information form.

Similar reference characters denote corresponding features consistently throughout the attached drawings.

DETAILED DESCRIPTION OF THE PREFERRED EMBODIMENT

Figure 1:
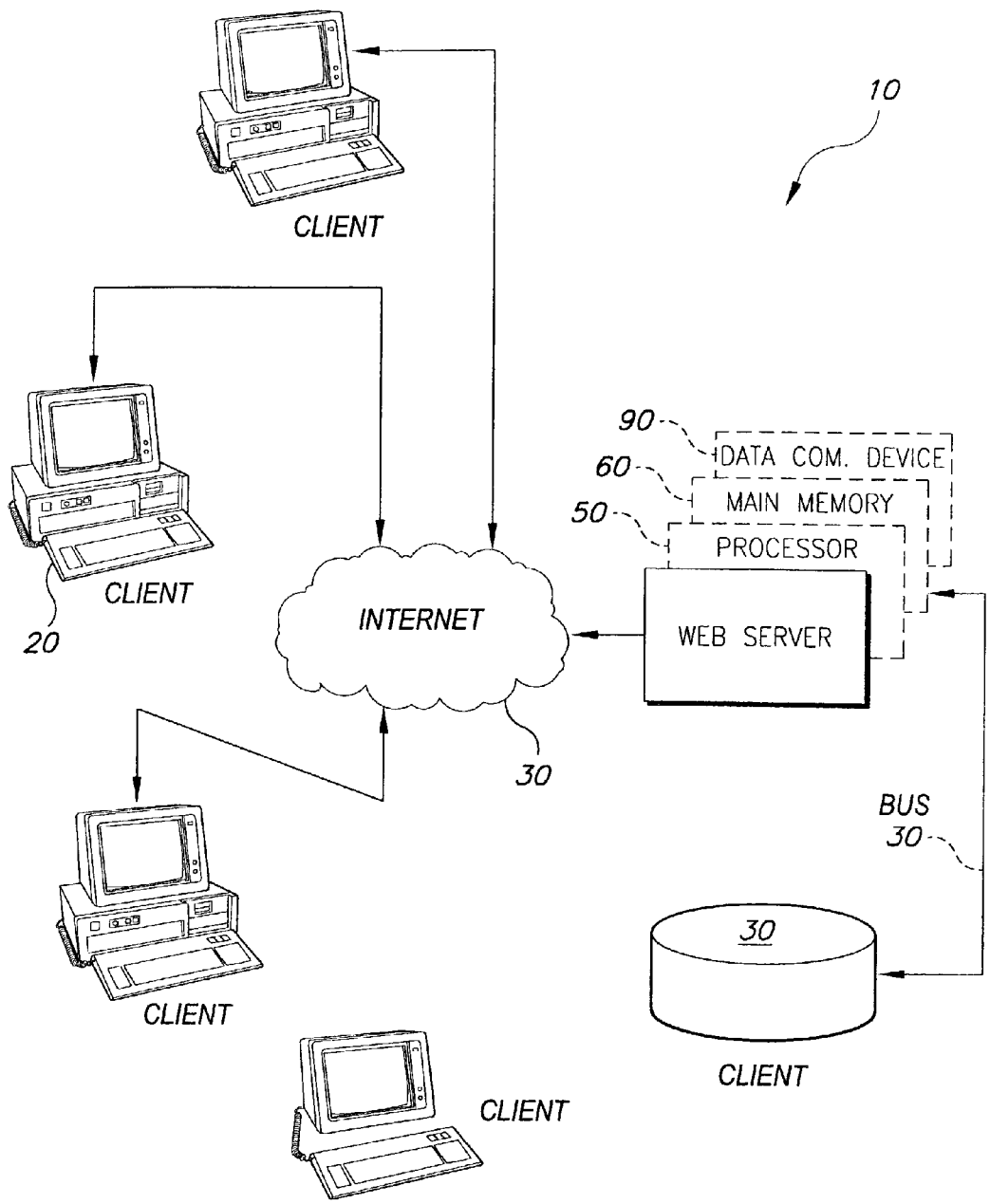
FIG. 1 is a system overview for training and organizing on-site event professionals according to the present invention.
Figure 9C:

The present invention is a representative computerized system 10 and method in which the present invention operates, as shown in FIG. 1. The computerized system 10 uses a client-server technology, including a plurality of clients 20 connected to a Web server 40, through a computer network, preferably the Internet 30, although the computerized system 10 may operate on an intranet or extranet. The Web server 40 has a processor 50 for processing instructions and an area of main memory 60 for executing program code under the direction of the processor 50 connected by a bus 80.

The computerized system 10 also includes at least one relational database 70 for storing data. The relational database 70 may reside in an area of disk storage on the Web server 40 and be connected to the main memory by the bus 80, or may reside on a remote database server accessible by the Web server 40, as is known in the related art. A data communications device 90 is connected to the bus 80 for connecting the Web server 40 to the Internet 30. The client computers 20 have a Web browser operable thereon, for receiving and viewing documents written in Hypertext Markup Language (HTML). These documents are transmitted over the Internet 30 via Hypertext Transfer Protocol (HTTP) by the Web server 40 and transmit requests for HTML documents to the Web server 40 via HTTP.

The present invention includes software program code stored on a computer readable medium and is operable in main memory 60 on the Web server 40 for training and organizing on-site event professionals in the hospitality and tourism industry (COSEPs), which is accessible to a client computer 20 through the Internet 30. As used in the present application, the term "computer readable medium" refers to a hard disk drive, a floppy diskette, a ZIP disk or any other magnetic storage media capable of storing coded program instructions. This can also include optical or laser storage devices, such as compact disks, laser disks, paper tape, punch cards or any other media for the storage of program instructions readable by a disk storage device or reader. The computer code may be written in Java (Java is a trademark of Sun Microsystems), HTML, XML or Microsoft's Active Server Pages (ASP), and includes code for training and organizing on-site event professionals in the hospitality and tourism industry.

The following system 10 and method is used to provide persons with the industry knowledge, professional perspective and core skills necessary to become a Certified On-Site Event Professional, or COSEP. Once a person has completed the training from this system and method, they can then register to take a certification exam, which upon passing allows the person to be eligible for on-site placement.

FIG. 2 is a sample Arrival Manifest 100 that is based on industry standards for manifests. Although style of presentation may differ from company to company, the core components of the manifest will always remain the same. These core components include passengers' last names, passengers' first names, departure airports, indications of whether airline or train transportation is used, flights or train numbers, cities of origin and arrival times.

For many businesses and corporations, providing an inbound guest with meet and greet@ services is the hallmark of excellent customer care. In the hospitality and tourism industry, a meet and greet@ is defined as the process of connecting with incoming guests as they arrive at the airport or train station, collecting their baggage and then escorting them to a pre-arranged vehicle for transfer to their destination. Everyone knows how hectic an airport or train station can be, how slow the taxi line can seem and how much time renting a car can consume. Meet and greets@ were created to streamline the arrival experience for guests, eliminating wait time and worry in the process. As a greeter, you are a representative of the client and the welcome you extend to the guests will set the tone for their entire visit.

As shown in FIGS. 3A, 3B and 3C, the Meet and Greet Program Information Form 110 includes basic initial information such as client's names, client codes, dates of service, order numbers and the total number of COSEPs needed for meet and greets@. The exact report location indicates the particular airport or train station location where the meet and greet@ occurs. Specific company contact information, such as contact names, office phone numbers and a mobile phone number is also included. Program information, such as program names, number of guests, billing reference, program demographics and guest greet locations are also provided on the Meet and Greet Program Information Form 110. Transportation information such as the name of the vendor providing the transportation with a contact name and phone number, the vehicle type and the vehicle report location are also provided. The type of attire, whether it be business or casual, is also noted in addition to any communications equipment provided, and a notation as to whether a manifest and signage are delivered to the site. Finally, basic COSEP information such as COSEP names, report locations, report times, end times and attire for each COSEP is also indicated.

For many businesses and corporations, providing departing guests with departure transportation services is another hallmark of excellent customer care. In the hospitality and tourism industry, a departure is defined as the process of connecting with guests post-checkout as they prepare to leave their hotel, assisting them with baggage and escorting them to a pre-arranged vehicle, for transfer to the airport or train station. Everyone knows how hectic rushing to make a flight or train can be, how expensive the taxi service can be and how much time returning a rental car can consume. Departures were created to streamline the outbound experience for guests, eliminating wait time and worry in the process. The COSEP is a representative of the client and the thanks for coming, hope you had a wonderful stay@ extended will complete an excellent visit.

FIGS. 4A, 4B and 4C make-up a Departure Program Information Form 120, which starts with indicating client codes, dates of service, an approximate number of COSEPs used, report start times of each COSEP, end times of each COSEP and report locations. Company information, such as company names, contact names and phone numbers is also provided on the Departure Program Information Form 120, in addition to program information, such as program names, number of guests and program demographics. FIGS. 4A, 4B and 4C indicate each guest departure location, the approximate number of guests and airport or train stations that the guests are being transferred to. Transportation information includes vendors providing the transportation, contact names and phone numbers, as well as any vehicles provided. Attire requirements are also indicated, whether formal or casual, and each COSEPs name, report locations, start times, end times and attire are also noted.

Hotel requirements for larger meetings, events, programs and conventions always exceed the possible number of rooms available at a single hotel. In fact, often fifteen or more hotels will be needed in order to provide accommodations for all attendees in need of rooms, especially when the overall guest total can number anywhere from 1,000 to 20,000 people. The company hosting the main program needs to develop bus routes with dependable timelines, between the multitude of hotels and the destination points, in order to fully maximize guest attendance at the core meetings and events. A standard shuttle is a continuous point-to-point transfer usually between a single hotel and a meeting or event facility. City-wide shuttles are expansive versions of the standard shuttle that incorporate numerous boarding and drop-off locations. The vehicles follow a pre-determined route and run continuously during a specific period of time.

FIGS. 5A, 5B, 5C and 5D illustrate a City-Wide Shuttles Program Information Form 130, which includes client codes, dates of service, an approximate total number of COSEPs and report locations. Previously discussed company information and program information is also included. Specific shuttle information such as primary destinations, route numbers, starting locations, shuttle start times and end times provided for each city-wide shuttle, as well as shuttle stops, the approximate number of guests and the pick-up and drop-off locations. Transportation information includes the vendor providing the transportation, the contact name and phone number, as well as vehicle types for each vendor involved with the city-wide shuttle. Indication of type of attire, formal or casual, is also noted in addition to COSEP names, report locations, report times, end times and attire.

A standard program will consist of several separate meetings or events over the course of several days. During small and average-sized in-bound programs, the guests or attendees fly or take the train to the venue, and for convenience and planning purposes, stay at a single hotel. During the overall program, some individual meetings or events will be hosted at a location other than the hotel. These off-sites@ require the client to provide an organized method of transportation for the guests, most of whom will not have a private vehicle at their disposal. It is the COSEP's responsibility to ensure that the guests experience an efficient, friendly transfer that keeps to the program timeline. The guests will assemble in the lobby, board vehicles and be transferred to the off-site venue. The vehicles will then stage in an appropriate and convenient location, typically chosen by an On-Site Manager, until the meeting or event is concluded and the guests are ready to re-board and return to the hotel.

FIGS. 6A, 6B and 6C depict a Point-to-Point Transfer Program Information Form 140 provided with client codes, dates of service and an approximate total number of COSEPs for the program. Company information and program information that was discussed in FIGS. 5A, 5B, 5C and 5D are also provided in addition to an approximate number of COSEPs and their report start times and end times. Transportation information and type of attire information that was previously discussed in FIGS. 5A, 5B, 5C and 5D are also provided in FIGS. 6A, 6B and 6C as well. Points of origin, destinations, approximate number of guests, start times and end times for each point-to-point transfer is also provided, in addition to previously discussed names, report locations, report times, end times and attire for each COSEP.

Many large cities are overflowing with historic landmarks, national monuments, museums, gardens, stunning views and interesting architecture. Half-day and full-day sightseeing packages or tours offer visiting guests the opportunity to choose specific areas of a visited city, to explore without the hassles of parking, admissions fees and unguided wanderings. For many businesses and corporations, providing guests with pre-arranged guided tours of a visited city is a hallmark of excellent customer care. Typically, guests will choose from a variety of tour options, can register either in advance of the meeting or on-site at a registration desk, and may be responsible for a portion of or all of the ticketed price.

A sample of a tour summary is provided on FIG. 7. The Tour Summary 150 includes dates of the tour, tour report times, tour end times, tour names, tour guides, transportation vendors providing transportation for the tour, type and capacity of vehicles provided and reporting times. FIG. 7 is also used often in combination with FIGS. 8A and 8B, which make-up the Tour Programs Program Information Form 160. The Tour Program's Program Information Form 160 contains mostly previously discussed information such as client codes, dates of service, an approximate total number of COSEPs, COSEPs' reporting and ending times, company information, program information and attire requirements. Information as to whether guests will be ticketed and who would be responsible for collecting tickets is also provided, in addition to COSEP names, report locations, report times, end times and attire details.

Through working different events, COSEPs experience firsthand the complex process, time constraints and hard work required to physically piece together and prepare an actual event. The range of responsibilities for an event can include monitoring vendors as they set-up prior to the event, guest check-in and name badge distribution, welcoming guests and informing them of the program layout, working the registration table or the gift table, attending to the needs of VIPs or celebrities and answering general questions about the event timeline. As with all events, the primary focus is to deliver the highest standard of customer care with the utmost professionalism. As a rule of thumb, the more familiar a COSEP is with venue specifics and on-site responsibilities and expectations assigned by the on-site manager, the more efficiently the needs of the clients and guests will be met.

FIGS. 9A, 9B, 9C and 9D illustrate an Events Program Information Form 170. The Events Program Information Form 170 is more detailed than the previous forms. Client codes, dates of service, an approximate total number of COSEPs used, each COSEP's responsibility, report times and end times are disclosed in the Events Program Information Form 170. Previously described company information and detailed program information, such as event names, an approximate number of guests, start times, end times, event demographics and event locations are provided. Previously discussed transportation and attire requirements are also included. Specific event vendor information such as vendor names, contact names of each vendor, contact phone numbers, report locations, report times, end times, services provided and any other comments are provided. There is also an event time line that describes event activities on an hourly basis for each day of the event.

Few things are more irritating than needing an answer to a question and finding that there is no one available to assist you. Hospitality desks are designed to resolve this frustration in a friendly, knowledgeable fashion by providing useful information and resources in a central location inside an event facility. This service is largely used in conjunction with meetings and multi-day programs. On-site responsibilities include answering questions about the meeting time line, checking-in attendees, handing out written materials or gifts on behalf of the client and suggesting local restaurants and attractions. Working at a hospitality desk can last several days and may require working with a certified tour guide to ensure the highest quality of service possible.

FIGS. 10A, 10B and 10C illustrate a Hospitality Desk Program Information Form 180. It provides client codes, dates of service, an approximate total number of COSEPs, report locations, report times and end times as well as previously discussed company information, program information, program demographics, an approximate number of guests, program locations, phone numbers, attire requirements and COSEP names on each day of service.

COSEPs must always focus on customer service. Clients staff registration desks to offer visiting guests the opportunity to choose specific sightseeing packages, that allow them to explore the location they are visiting without the hassles of parking, admission fees and unguided wanderings. Other guests that approach the registration desk may be more interested in registering to attend program meetings or evening parties and dinners. During larger meetings, conventions or incentive programs, businesses and corporations will often provide guests with an opportunity to purchase tickets to pre-arranged events, special meetings or guided tours. Typically, guests will choose from a variety of tour packages, dinner events or meeting options, and will have the option of registering in advance of the meeting by mail or on-site with you at the registration desk.

FIGS. 11A, 11B and 11C illustrate a Registration Desk Program Information Form 190. It provides client codes, dates of service, an approximate total number of COSEPs, report locations, report times and end times, as well as previously discussed company information, program information, program demographics, an approximate number of guests, program locations, phone numbers, attire requirements and COSEP names on each day of service.

It is to be understood that the present invention is not limited to the sole embodiment described above, but encompasses any and all embodiments within the scope of the following claims.

I claim:

1. A computerized system for training and organizing on-site event professionals (COSEPs) in the hospitality and tourism industry, comprising:

at least one server computer having a processor, an area of main memory for executing program code under the direction of the processor, a storage device for storing data and program code and a bus connecting the processor and the storage device;

at least one relational database stored on said storage device;

a data communications device connected to said bus for connecting said server computer to the Internet; and Web-based training for on-site event professionals with computer program code stored in said storage device and executed in said main memory, under the direction of said processor, the computer program code including:

means for training and organizing professionals for connecting with incoming guests as they arrive at an airport or train station, collecting their baggage and then escorting them to a pre-arranged vehicle for transfer to their next destination;

means for training and organizing professionals for connecting with outbound guests as they prepare to depart a hotel, collecting their baggage and then escorting them to a pre-arranged vehicle for transfer to an airport or train station;

means for training and organizing professionals to develop transportation routes with dependable timelines between a multitude of hotels incorporating numerous boarding and drop-off locations;

means for training and organizing professionals for organizing methods of transportation for guests during a scheduled program for off-site events;

means for training and organizing professionals for providing guests with pre-arranged guided tours;

means for training and organizing professionals for preparing an on-site event;

means for training and organizing professionals for providing useful information and resources at a central location of an event;

means for training and organizing professionals for answering questions about tour program options and timelines, distributing tickets to advanced purchasers and handing out descriptive tour materials.

2. The computerized system according to claim 1, wherein an arrival manifest is utilized to train COSEPs and help organize an event.

3. The computerized system according to claim 2, wherein the arrival manifest includes a guest's last name, first name, departure airport, airline flights or train numbers, cities of origin and arrival times.

4. The computerized system according to claim 1, wherein a meet and greet program information form is utilized to train COSEPs and organize an event.

5. The computerized system according to claim 4, wherein the meet and greet program information form includes basic initial information, exact report location, company contact information, program information, transportation information, type of attire for COSEPs and basic COSEP information.

6. The computerized system according to claim 1, wherein a departures program information form is utilized to train COSEPs and organize an event.

7. The computerized system according to claim 6, wherein the departures program information form includes client's codes, dates of service, a total number of COSEPs used, report times of each COSEP, end times of each COSEP and report locations, company information, program information, transportation information and type of attire for COSEPs and basic COSEP information.

8. The computerized system according to claim 1, wherein a city-wide shuttles program information form is utilized to train COSEPs and organize an event.

9. The computerized system according to claim 8, wherein the city-wide shuttles program information form include client's codes, dates of services, a total number of COSEPs, report locations, company information, program information, specific shuttle information, transportation information, type of attire for COSEPs and basic COSEP information.

10. The computerized system according to claim 1, wherein a point-to-point transfers program information form is utilized to train COSEPs and organize an event.

11. The computerized system according to claim 10, wherein the point-to-point transfers program includes client codes, dates of service, a total number of COSEPs, company information, program information, transportation information, type of attire for COSEPs, basic COSEP information, point of origins, destinations, an approximate number of guests, start times and end times.

12. The computerized system according to claim 1, wherein a tour summary is provided to train COSEPs and organize an event.

13. The computerized system according to claim 12, wherein the tour summary includes tour dates, tour start times, tour end times, tour names, tour guides, transportation vendor's names, types and capacity of any vehicles provided and reporting times.

14. The computerized system according to claim 1, wherein a tour program's program information form is used to train COSEPs and organize an event.

15. The computerized system according to claim 14, wherein the tour program's program information form includes client codes, dates of service, company information, program information, type of attire for COSEPs and basic COSEP information and information as to whether guests will be ticketed and who would be responsible for collecting tickets.

16. The computerized system according to claim 1, wherein an event's program information form is used to train COSEPs and organize events.

17. The computerized system according to claim 16, wherein the event's program information form includes client codes, dates of service, knowing the number of COSEPs used and their report times and end times, company information, program information, specific event vendor information, transportation information, an hourly event timeline, COSEP responsibilities and type of attire for COSEPs and basic COSEP information.

18. The computerized system according to claim 1, wherein a hospitality desk program information form is used.

19. The computerized system according to claim 18, wherein the hospitality desk program information form includes client codes, dates of service, type of attire for COSEPs and basic COSEP information, report locations, report start times, report end times, company information, program information, program demographics, an approximate number of guests, program locations and phone numbers.

20. The computerized system according to claim 1, wherein a registration desk program information form is used.

21. The computerized system according to claim 20, wherein the registration desk program information form includes client codes, dates of service, a total number of COSEPS, report locations, report times, company information, program information, program locations, type of attire for COSEPs and basic COSEP information.

22. A computer program product that includes a medium readable by a processor, the medium having stored thereon a set of instructions for training on-site event professionals system, comprising:
a first sequence of instructions which, when executed by the processor, causes the processor to train and organize professionals for connecting with incoming guests as they arrive at an airport or train station, collecting their baggage and then escorting them to a pre-arranged vehicle for transfer to their next destination;
a second sequence of instructions which, when executed by the processor, causes the processor to train and organize professionals for connecting with outbound guests as they prepare to depart a hotel, collecting their baggage and then escorting them to a pre-arranged vehicle for transfer to an airport or train station;
a third sequence of instructions which, when executed by the processor, causes the processor to train and organize professionals to develop transportation routes with dependable timelines between a multitude of hotels incorporating numerous boarding and drop-off locations;
a fourth sequence of instructions which, when executed by the processor, causes the processor to train and organize professionals for organizing methods of transportation for guests during a scheduled program for off-site events;
a fifth sequence of instructions which, when executed by the processor, causes the processor to train and organize professionals for providing guests with pre-arranged guided tours;
a sixth sequence of instructions which, when executed by the processor, causes the processor to train and organize professionals for preparing an on-site event;
a seventh sequence of instructions which, when executed by the processor, causes the processor to train and organize professionals for providing useful information and resources at a central location of an event; and
an eighth sequence of instructions which, when executed by the processor, causes the processor to train and organize professionals for answering questions about tour program options and timelines, distributing tickets to advanced purchasers and handing out descriptive tour materials.

23. A computerized method for training on-site event professionals in the hospitality and tourism industry over the Internet, comprising the steps of:
training and organizing professionals for connecting with incoming guests as they arrive at an airport or train station, collecting their baggage and then escorting them to a pre-arranged vehicle for transfer to their next destination;
training and organizing professionals for connecting with outbound guests as they prepare to depart a hotel, collecting their baggage and then escorting them to a pre-arranged vehicle for transfer to an airport or train station;
training and organizing professionals to develop transportation routes with dependable timelines between a multitude of hotels incorporating numerous boarding and drop-off locations;
training and organizing professionals for organizing methods of transportation for guests during a scheduled program for off-site events;
training and organizing professionals for providing guests with pre-arranged guided tours;

training and organizing professionals for providing guests with pre-arranged guided tours;

training and organizing professionals for providing useful information and resources at a central location of an event; and training and organizing professionals for answering questions about tour program options and timelines, distributing tickets to advanced purchasers and handing out descriptive tour materials.

* * * * *

UNITED STATES PATENT AND TRADEMARK OFFICE
CERTIFICATE OF CORRECTION

PATENT NO. : 6,979,199 B2  
DATED : December 27, 2005  
INVENTOR(S) : Barron

It is certified that error appears in the above-identified patent and that said Letters Patent is hereby corrected as shown below:

Column 10,  
Line 47, after "Internet" insert -- having at least one computer and a data communication device for connecting the computer to the Internet, --.  
Lines 48, 53, 58, 62 and 65, after "training and organizing professionals" insert -- by the computer --.

Column 11,  
Lines 1 and 2, after "training and organizing professionals" insert -- by the computer --; after "for" insert -- preparing an on-site event --; and delete "providing guests with pre-arranged guided tours".  
Line 3, after "training and organizing professionals" insert -- by the computer --.

Column 12,  
Line 1, after "training and organizing professionals" insert -- by the computer --.

Signed and Sealed this

Twenty-first Day of February, 2006

JON W. DUDAS  
*Director of the United States Patent and Trademark Office*